Aug. 10, 1971      W. A. BARBER      3,598,657

METHOD OF PLATINIZATION OF A FUEL CELL ELECTRODE

Filed April 30, 1968

INVENTOR.
WILLIAM AUSTIN BARBER

BY

ATTORNEY

United States Patent Office 3,598,657
Patented Aug. 10, 1971

3,598,657
METHOD OF PLATINIZATION OF A FUEL CELL ELECTRODE
William Austin Barber, Stamford, Conn., assignor to American Cyanamid Company, Stamford, Conn.
Filed Apr. 30, 1968, Ser. No. 725,421
Int. Cl. C23c *3/02;* H01m *27/10*
U.S. Cl. 136—120       10 Claims

ABSTRACT OF THE DISCLOSURE

A method for enhancing a catalytic electrode adapted for use in a fuel cell which comprises: incorporating a reducing agent into an electrode structure during initial fabrication of the said electrode prior to catalyst incorporation therein; contacting the so-formed electrode with a noble metal or non-noble metal catalyst compound dissolved in a solvent medium and effecting reduction of said metal compound, whereby catalyst is uniformly deposited on said electrode.

---

Figure 1:
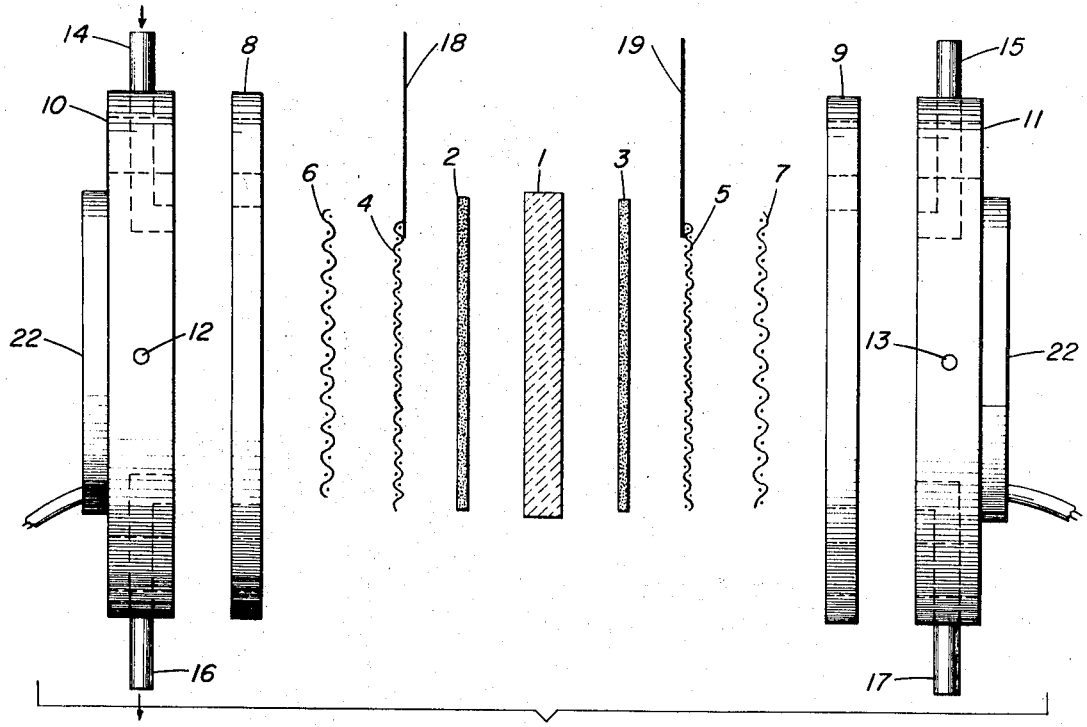

The present invention is concerned with methods of improving electrodes which can be used in typical free electrolyte or matrix fuel cells, such as, for instance, hydrogen-air, hydrogen-oxygen, ammonia-air, or hydrazine-oxygen fuel cells or as air electrodes for zinc-air batteries. More particularly, this invention relates to the incorporation of a catalyst into an electrode structure.

In general, noble metal catalysts, such as platinum and palladium, non-noble metal catalysts, such as silver, nickel and mercury-silver mixtures can be incorporated into an electrode by various methods to form a complete activated catalytic electrode when employed in a fuel cell environment. One of these methods is to include the catalyst along with the conductive filler material, such as by depositing the catalyst thereon prior to the formation of the electrode. The deposited catalyst with the conductive filler is then incorporated into the electrode structure. Alternatively, the structure of the electrode may be initially formed and, thereafter, the catalyst metal compound is deposited on the formed sheet by techniques such as electrochemical deposition, or by absorption followed by thermal reduction to activate the resultant electrode sheet. The utilization of such methods which result in catalytic electrode formation, unfortunately, often results in a product of poor quality whereby the electrode's efficiency during normal fuel cell operation is markedly lessened.

It is, therefore, a principal object of the invention to provide a method of incorporating a catalytic material into an electrode without causing deterioration of the electrode's effectiveness. A further object is to provide a method of manufacture for a catalytic electrode which is characterized by having uniform catalytic activity over the electrode surface improving normal cell operation. A still further object is to provide a process of activated catalytic electrode manufacture which may be continuous or semi-continuous in operation. Other objects and advantages will be readily ascertained from a consideration of the ensuing description.

According to the process of the invention, it has been found that a catalytic electrode of enhanced performance can be prepared by initially incorporating a reducing agent into an electrode structure during its fabrication and prior to catalyst formation. The reducing agent which can be added in the initial fabrication step includes advantageously any conventional organic or inorganic reducing compound compatible with a selected electrode structure and capable of effecting a reduction and deposition of subsequently introduced noble metal or non-noble metal compound.

Illustrative of the reducing agents contemplated within the purview of the process of the invention are: sodium formate, ammonium formate, potassium formate, calcium formate, sodium oxalate, sodium borohydride, sodium tartrate, potassium sodium tartrate, sodium citrate, sodium hypophosphite and hydrazine sulfate.

A variety of electrode structures including both screen and screenless electrode types is advantageously contemplated by the process of this invention. A preferred electrode can, for instance, be prepared by blending as by mixing or milling polymethylmethacrylate, a polytetrafluoroethylene dispersion, and a conductive filler, such as graphite, along with a reducing agent, such as sodium formate, at a temperature between 170° C. and 200° C. The heated admixture can then be cooled to about room temperature, pelletized, and extruded into a sheet. This sheet is next treated with a solvent, such as acetone, to extract the polymethylmethacrylate and, finally, dried. The electrode sheet this obtained can be characterized as a relatively light weight, electrically conductive, self-supporting, porous, unsintered electrode pre-treated structure.

In general, the electrode structure hereinabove prepared is next exposed to an organic solvent medium containing dissolved therein a catalytic noble or non-noble metal compound in which the reducing agent present in the sheet remains substantially undissolved. The solvent selected is one in which the reducing agent remains substantially unaffected, but the catalytic compound is soluble. For instance, aliphatic alcohols, such as ethanol or glycol, and ketones, such as acetone or methyl-ethyl ketone, solubilize chloroplatinic acid, but do not substantially affect the reducing agent which is present in the above-formed fabricated electrode. In this environment the catalytic metal compound present in the said solvent is reduced and deposited uniformly on the electrode sheet, thereby forming the improved electrode sheet of the present invention.

It is a good practice of the invention to effect the aforementioned reduction by immersing a pre-treated fabricated structure into a solution of chloroplatinic acid in a solution of methyl-ethyl ketone-acetone at a 1:1 ratio for a period of from 5 to 45 minutes, but preferably from 15 to 20 minutes. During this time the reaction medium is held at a temperature between about 20° C. and about 80° C., but preferably from about 50° C. to about 55° C. If desired, a small amount of ethanol or water may be added to increase the rate of uniform deposition of the platinum being formed on the sheet by reduction.

In order to further clarify the invention, utilizing a uniformly distributed activated catalyst on an electrode surface, a fuel cell wherein the electrodes of this invention may be used is shown in the accompanying drawing which will be described in detail in conjunction with that drawing.

Figure 2:
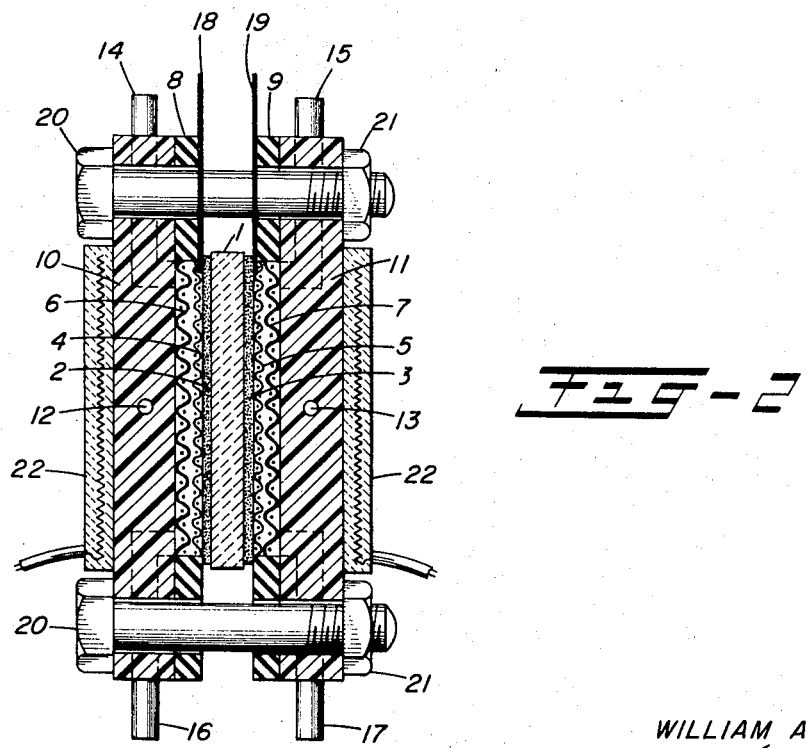

In the drawing:

FIG. 1 is an exploded plan view, partially in section, of a fuel cell employing the electrode of the present invention, and FIG. 2 is a partially expanded side view, partially in section, of the fuel cell of FIG. 1.

In FIG. 1, a 5 N sulfuric acid or 5 N potassium hydroxide saturated filter paper membrane 1 is positioned between the electrode 2 prepared by the process of the invention and a suitable oxygen electrode 3, such as platinum. Abutting the electrodes are current collector screens 4 and 5 which comprise, for instance, tantalum, for the acid electrolyte, nickel for the basic electrolyte, or other suitable inert metal. In the event 5 N sulfuric acid electrolyte is used, tantalum wire mesh spacers 6 and 7 are employed to compress the collector screens against the electrodes providing for better contact between screen and electrode as well as electrode and matrix. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are inserted and attached thermocouple 12 and heat control probe 13 and having inlet stainless steel or other inert metal tubing 14 and 15 through which readily available hydrogen and oxygen are separately introduced into the fuel cell. Stainless steel tubing 16 and 17 are provided as vents for unused gases. Wire leads 18 and 19, connected onto current collector screens 4 and 5 are the conductive members through which current flows from and to the fuel cell through the external circuit when the fuel cell is in operation. The cell, secured by means of bolts 20 and nuts 21 as shown in FIG. 2, can be heated when desired by an external electrical heating pad 22. The temperature of the cell, determined by thermocouple 12, is controlled by heat control probe 13.

In order to demonstrate the improvements and advantages of the electrodes prepared by the process of the present invention, the following illustrative examples, which are to be taken as non-limiting, are presented. Unless otherwise stated, the parts are by weight.

EXAMPLE 1

A conventional fuel cell electrode is prepared by mixing 85 parts of graphitic carbon containing 10% platinum deposited thereon with 15 parts of polytetrafluoroethylene as a 60% aqueous emulsion, and spreading the resulting mixture on a 100 mesh nickel screen in such quantity as to give a platinum loading of 1 milligram platinum per square centimeter. After washing, this electrode is ready for use as a conventional screen-supported electrode.

EXAMPLE 2

A fuel cell electrode is prepared by mixing 85 parts graphitic carbon with 20 parts of sodium formate powder and 15 parts polytetrafluoroethylene as a 60% aqueous emulsion and spreading the resulting mixture on a 100 mesh nickel screen in such quantity as to give a carbon loading of 10 milligrams per square centimeter. This mixture, forming the electrode sheet, is then allowed to dry.

Catalytic platinum is then applied to the electrode by immersing the electrode sheet in a 1:1 ratio mixture of acetone and methyl-ethyl ketone in which chloroplatinic acid is dissolved. The electrode is kept in the solution for 15 to 20 minutes at a temperature of 50° C. to 55° C. A few drops of ethanol are added to speed up the reaction and by this method platinum is reduced on the electrode sheet in an active catalytic deposit. The chloroplatinic acid concentration in the solution is adjusted so that the resulting electrode sheet contains 1 milligram platinum per square centimeter.

A 1" disc cut from this electrode sheet is assembled in the fuel cell described above, using 5 N KOH as the electrolyte and this electrode is used as the air electrode while a platinum black electrode having a loading of 10 milligrams platinum per square centimeter is used as the hydrogen electrode.

The amount of current which can be drawn from a cell thus assembled is a measure of the quality of the electrode. Table I below shows the results obtained at three different voltage levels. For comparison, a similar test is made with the electrode of Example 1 which is a conventionally platinized screen electrode. It can be readily seen that at least 25% more current can be obtained from an electrode platinized by the manner defined by the process of this invention.

TABLE I

| Electrode (loading of 1 mg. Pt/cm.²) | Current density (ma./cm.²) | | |
|---|---|---|---|
| | 0.75 v. | 0.65 v. | 0.55 v. |
| Conventional electrode (Example 1) | 130 | 210 | 250 |
| Electrode of Example 2 | 170 | 260 | 320 |

EXAMPLE 3

194 parts of polymethylmethacrylate are heated and milled to a molten viscous state on a rubber mill maintained at a temperature between 170° C. and 175° C. Two parts of polytetrafluoroethylene as a 60% aqueous emulsion and 43 parts graphite containing 10% platinum deposit thereon are blended into the molten polymethylmethacrylate. Upon cooling of the blend, the latter is ground to pellets and injection molded into a ⅛" by 2" by 4" plaque. The plaque is next compression molded at temperatures between 180° C. and 200° C. and at a pressure of about 1000 p.s.i. into a sheet 30 mils thick and 6" square. The latter sheet is then immersed in acetone for 16 hours at 25° C. so as to extract the polymethylmethacrylate therefrom. Thereafter, the sheet is washed with acetone for 1 to 2 hours in two subsequent washings. This sheet is dark gray in color, flexible and is found to be from 9 to 11 mils thick and has a catalyst coating of 1 milligram platinum per square centimeter. This is a conventional pre-platinized screenless electrode.

EXAMPLE 4

194 parts of polymethylmethacrylate are heated and milled to a molten viscous state on a rubber mill maintained at a temperature between 170° C. and 175° C. Two parts of polytetrafluoroethylene in a 60% aqueous emulsion and 43 parts graphite along with 15 parts of sodium formate are blended into the molten polymethylmethacrylate. Upon cooling of the blend, the latter is ground into pellets and injection molded into a ⅛" by 2" by 4" plaque. The plaque is next compression molded at temperatures between 180° C. and 200° C. at a pressure of about 1000 p.s.i. into a sheet 30 mils thick and 6" square. The latter sheet is then immersed in acetone for 16 hours at 25° C. so as to extract the polymethylmethacrylate therefrom. Thereafter, the sheet is washed with acetone for 1 to 2 hours in two subsequent washings. This sheet is dark gray in color, flexible and is found to be from nine to eleven mils thick.

Catalytic platinum is then applied to the electrode sheet as described in Example 2 to give an electrode sheet containing 1 milligram platinum per square centimeter.

This electrode is tested following the procedure of Example 2 employing 5 N KOH as both the oxygen and air electrode with the results shown in Table II, below.

As a comparison, the conventionally platinized screenless electrode prepared by the procedure of Example 3 is tested in the identical manner. On examination, it can be seen that the electrode platinized in the manner of this invention is far superior.

TABLE II

Oxygen Electrode

| Electrode (loading of 1 mg. Pt/cm.²) | Current density (ma./cm.²) | | |
|---|---|---|---|
| | 0.75 v. | 0.65 v. | 0.55 v. |
| Conventional electrode of Example 3 | 150 | 230 | 330 |
| Electrode of Example 4 | 250 | 400 | 820 |

Air Electrode

| | | | |
|---|---|---|---|
| Conventional electrode of Example 3 | 130 | 200 | 245 |
| Electrode of Example 4 | 160 | 240 | 300 |

EXAMPLE 5

The same pair of electrodes used in Example 4 are tested in the same cell but with a 5 N $H_2SO_4$ electrolyte. Under these conditions, good performance is obtained with the electrode of this invention.

What is claimed is:
1. A method of depositing catalytic metal in the structure of an electrically conductive, self supporting, porous, fuel cell electrode, comprising the steps:
 (a) fabricating an electrically conductive, self supporting, porous electrode structure with incorporated powder, dispersed therethrough during such fabrication, of a solid reducing agent for reducing a selected catalytic metal compound, and
 (b) contacting the porous structure of said electrode with a solution of said selected catalytic metal compound in an organic solvent which does not dissolve said reducing agent thereby causing reduction of said catalytic metal compound by said incorporated reducing agent and deposition of the reduced metal catalyst throughout said structure.

2. The method according to claim 1 wherein the electrode structure comprises polytetrafluoroethylene and graphite.

3. The method according to claim 1 wherein the reduction of the catalyst metal compound occurs at a temperature ranging from about 20° C. to about 80° C.

4. The method according to claim 1 wherein the catalyst metal deposited on said electrode is a noble metal.

5. The method according to claim 4 wherein the noble metal is platinum.

6. The method according to claim 1 wherein the reducing agent is sodium formate.

7. The method according to claim 1 wherein the solvent medium is an aliphatic ketonic solvent.

8. The method according to claim 7 wherein the ketonic solvent is acetone.

9. The method according to claim 7 wherein the ketonic solvent is methyl ethyl ketone.

10. The method according to claim 7 wherein the ketonic solvent is a 1:1 mixture of acetone and methyl ethyl ketone.

References Cited
UNITED STATES PATENTS

| | | | |
|---|---|---|---|
| 2,872,312 | 2/1959 | Eisenberg | 117—160X |
| 3,326,719 | 6/1967 | Beltzer et al. | 136—122X |
| 3,340,097 | 9/1967 | Hess et al. | 136—120 |
| 3,414,427 | 12/1968 | Levy | 117—130E |
| 3,393,098 | 7/1968 | Hartner et al. | 136—120X |
| 3,395,049 | 7/1968 | Thompson | 117—213X |
| 3,458,359 | 7/1969 | Fukuda et al. | 136—86 |

ALLEN B. CURTIS, Primary Examiner

M. J. ANDREWS, Assistant Examiner

U.S. Cl. X.R.
117—47